INVENTOR.
JOHN T. RYAN
BY
*Joseph E. Ryan*
ATTORNEY

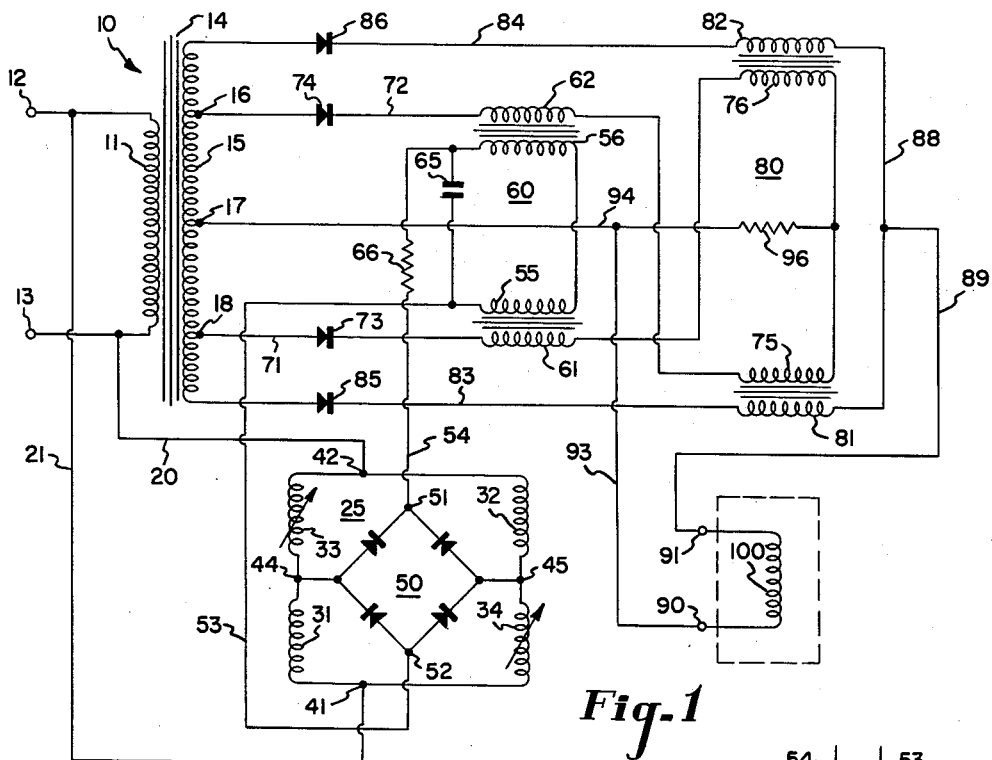
Fig. 1
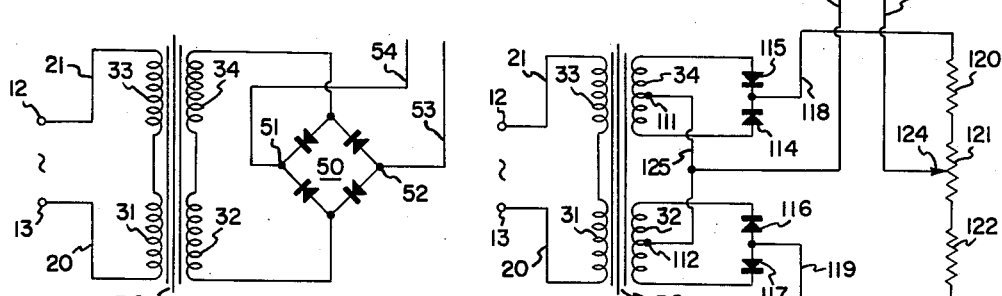
Fig. 2
Fig. 3
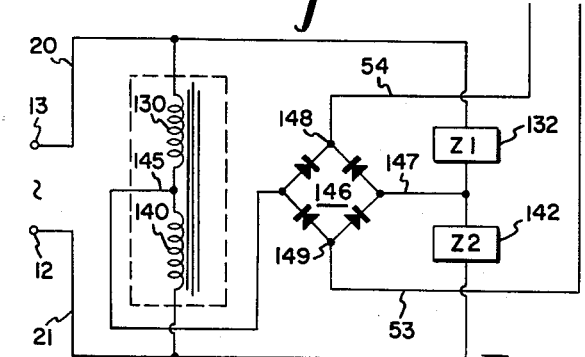
Fig. 4
INVENTOR.
JOHN T. RYAN
BY Joseph E. Ryan
ATTORNEY Oct. 30, 1962 J. T. RYAN 3,061,774
ELECTROMAGNETIC METAL DETECTING APPARATUS
Filed Feb. 18, 1959 2 Sheets-Sheet 2

United States Patent Office 3,061,774
Patented Oct. 30, 1962

3,061,774
ELECTROMAGNETIC METAL DETECTING APPARATUS
John T. Ryan, Boston, Mass., assignor to Minneapolis-Honeywell Regulator Company, Minneapolis, Minn., a corporation of Delaware
Filed Feb. 18, 1959, Ser. No. 794,150
14 Claims. (Cl. 324—34)

My invention relates to an electromagnetic metal detecting apparatus and more particularly to an improved apparatus for sensing the presence of a foreign metal having magnetic or low resistance electrically conductive properties.

Figure 5:
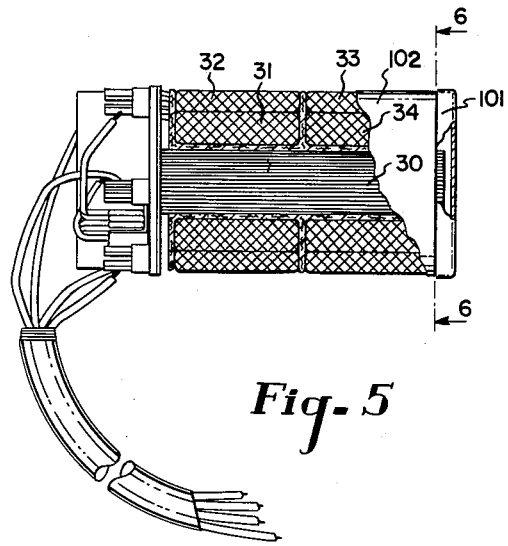
Figure 6:
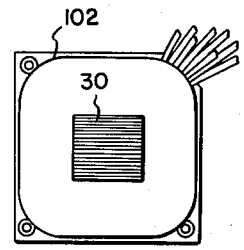
Figure 7:
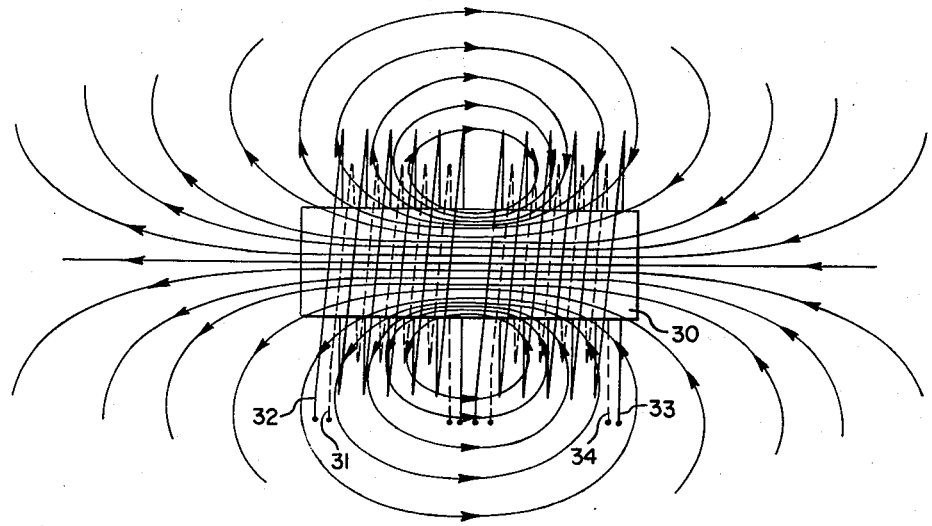

Metal detecting apparatus of the electromagnetic type is known in the art and it has found increased usage with trends toward automation and mass production manufacturing equipment. The present invention is directed specifically to an improvement in an apparatus of this type and particularly such as that shown in the copending application to Donald T. Longland, on Magnetic Control Apparatus, now Patent 2,934,698, dated April 26, 1960. The present device utilizes an improved and simplified sensor portion in the form of a single bar type magnetic core in place of the plural cores or bipolar members to provide an arrangement which will sense the presence of foreign metals which have magnetic properties or low resistivity electrically conductive properties. It is therefore an object of this invention to provide a simplified electromagnetic metal detecting apparatus having a unipolar type metal detector. A further object of this invention is to provide an apparatus of this type which is extremely sensitive, and has a high output voltage and increased impedance to simplify combination with associated controls. A further object of the invention is to provide an apparatus of this type utilizing a single bar type core which simplifies the arrangement of parts and provides for simplicity in positioning and mounting of the apparatus. These and other objects of the invention will become apparent from the reading of the attached description together with the drawings wherein FIGURE 1 is a schematic circuit diagram of the apparatus, FIGURES 2, 3 and 4 are schematic circuit diagrams of various embodiments of a portion of the apparatus, FIGURES 5 and 6 are plan and elevation views of the sensor portion of the apparatus in section, and FIGURE 7 is a flux diagram of the sensor.

This improved electromagnetic metal detector is adapted to be energized from an alternating current source and, as shown in FIGURE 1, the energizing circuit includes a transformer 10 having a primary winding 11 adapted to be connected to an alternating current supply through terminals 12 and 13. Transformer 10 has a secondary winding 15 having a plurality of taps 16, 17 and 18 for energizing the amplifier stages to be hereinafter described. The sensing portion of the apparatus is connected to the alternating current supply through conductors 20, 21 to a bridge circuit indicated in FIGURE 1 at 25. This detector or sensor utilizes a straight bar type magnetic core made up of a plurality of I type laminations, the core being indicated at 30 in FIGURE 5 and adapted to have a plurality of windings mounted thereon such as is indicated at 31-34 respectively therein. FIGURE 1 shows one embodiment or connection circuit from sensor windings or coils 31-34 and FIGURES 2, 3 and 4 show other circuit embodiments or modifications of the detector or sensor all employing this same core member. Referring specifically to FIGURE 1, the coils as in the above mentioned Longland patent are connected in opposite legs of the bridge circuit with the numerals 41, 42 indicating the energizing terminals of the bridge and the terminals 44—45 being the output terminals of the bridge circuit. The coils 31, 32 at one extremity of the core member are the inactive coils and are connected in diametrically opposite legs of the bridge while the coils 33—34 are at the active or the exposed end of the detector or core are similarly positioned in diametrically opposite sides of the bridge circuit 25. Connected across the output terminals of the bridge 44, 45 is a full wave rectifier 50 whose output terminals 51, 52 are connected through conductors 53, 54 respectively to the input windings of 55, 56 of a first stage of amplification 60. Control windings 55, 56 are mounted respectively on separate core members (not shown) which also carry power windings 61, 62 respectively. The control windings 55, 56 are serially connected to the output of the rectifier 50 to provide a direct current output from the detector 25 and include a condenser 65 in parallel or in shunt therewith for filtering purposes and a resistor 66 in series therewith also for filtering and regulating purposes. The power windings 61, 62 are connected respectively to the taps 18, 16 of the transformer secondary 14 through conductors 71 and 72 and rectifiers or diodes 73, 74 with the opposite extremities of the coils being connected in series with control windings 75, 76 of a second magnetic amplifying stage. This power circuit is completed through a conductor 94 connetced to the common connection of control windings 75, 76 and tap 17 of winding 15. The second amplifying stage 80 also includes two core members (not shown) having power windings 81, 82 mounted thereon respectively with the coils or control windings 75, 76. Amplifier section 80 similarly contains a pair of cores (not shown) upon which the windings are mounted and the power windings 81, 82 are connected through conductors 83, 84, and rectifiers 85, 86 to the extremities of the secondary winding 14 or a higher level of energization that is obtained at taps 16, 18 of the secondary winding. The power windings 81, 82 are connected in common at their opposite extremities through conductor 88 which in turn is connected to a conductor 89 and an output terminal 91 of the amplifier with a second output terminal 90 being connected to a return path or conductors 93, 94 connected to the center tap 17 in the secondary winding. Conductor 94 also includes a resistor 96 which is connected in common to the common connection of the serially connected control windings 75, 76 of amplifier 80 to complete the power circuit for amplifier 60. As shown in FIGURE 1, the output terminals 90, 91 are adapted to be connected to a relay winding shown in phantom at 100 and adapted to be positioned at a remote point for operation of conventional electrical contacts which perform switching operation or meter indications or other controlling functions.

The amplifiers 60 and 80 are pre-amplifier and power amplifier respectively controlling the operation of the remote control device or indicator. They are shown herein as magnetic amplifiers but may be other types of amplifying apparatus if desired. These two amplifier units are basically conventional self-saturating magnetic amplifiers of the doubler type employing only control and power windings. The tapped transformer permits a higher level of energization for the power amplifier than the pre-amplifier section and the output obtained therefrom in both stages is of the direct current type.

The sensing head 25 is basically the inductance bridge type which was also shown in the above mentioned Longland application except that herein it utilizes a unipolar or straight bar type core member to provide a somewhat different type of operation which greatly improves and simplifies the installation and construction of the apparatus. As will be seen in FIGURES 5-7, the coils of the sensor are mounted on the core member such that the active coils 33, 34 are positioned on one extremity of the core member or on one-half thereof and the coils 31, 32 are positioned on the opposite half, the coils being positioned concentrically with respect to the core member and themselves. Also the coils and core are covered by a magnetic and electrical shield in the form of a magnetic casing 102 which surrounds the sides of the coils and a stainless steel end cap 101 which permits the passage of flux therethrough. The details of the assembly shown in FIGURES 5 and 6 indicates that the end cap is butted to the open end of the casing 102 and is suitably secured thereto such as by soldering. In FIGURE 7, the energized coils generate a flux pattern which is basically sprayed out of the extremities of the core such that the coils near the active extremity of the sensor is directed through the cap and adapted to be distributed by a foreign metal which may be either magnetic or electrically of low resistivity. Thus when a block of foreign metal which is a magnetic material is brought in proximiay with the end cap 101, the material will tend to concentrate the flux lines causing more flux linkage between the inside and outside windings on one extremity of the core member tending to cause the apparent inductance of the front coils to become larger. With these coils positioned in the bridge circuit on diametrically opposed or opposite sides thereof, the effect is cumulative and the inductance ratio between the windings on adjacent sides of the bridge alters to unbalance the bridge and energize the rectifier 50 producing a direct current signal output to the control windings 55, 56 of the pre-amplifier section. As disclosed in the aforementioned Longland application, the pre-amplifier 60 employed herein is normally adjusted and designed to deliver current to the control windings of the said power amplifier with no control signal applied and the power amplifier under these conditions will provide no signal output to a remote device. With the presence of the control signal on the rectifier 50 of sensor head 25, the pre-amplifier section will be shut off or de-energized and the absence of control signal on the power amplifier will permit the power amplifier to deliver power to the remote device to be controlled. It will be understood that the electrical characteristics of the windings are such as to provide a normally balanced output circuit within normal manufacturing tolerances as in the before mentioned Longland patent. Thus the windings in the bridge network circuit which are in common with respect to the input conductors will have the same ampere turns and be equally distributed on the core halves to provide a null output under conditions when no metal is in proximity with the active end of the core member.

FIGURES 2, 3 and 4 show various circuit connections for the coils on the sensing head or detector. In these circuit connections, the windings in common, such as in the primary or secondary circuits, or in common in a bridge network, will be of the same electrical characteristics and be uniformly distributed over the core halves to provide a balanced or null output under normal or inactive operating conditions. In FIGURE 2, which shows only the circuit details for the second embodiment of the sensor it will be understood that the power leads and the input to the sensor and the output therefrom will be connected respectively to the power source and the pre-amplifier section as in FIGURE 1. The windings 31 and 33 are adapted to be connected in a series relationship and to the conductors 20, 21 leading to the power source 12, 13. These windings are primary windings for the sensor which cooperates with secondary windings 32, 34 which are connected in series opposed relationship and in series with a full wave rectifier 50. Rectifier 50 has output terminals 51, 52 which are connected to the conductors 53, 54 leading to the control windings of the pre-amplifier section which with the power amplifier are omitted in FIGURE 2 for simplicity. The windings 31–34 are mounted on the straight bar type core member 30 shown schematically in FIGURE 2 which is the same as that shown in FIGURES 5 and 6. With no foreign metal present near the active extremity at the detector or in proximity with the coils 33, 34 which are positioned on one-half of the core member, the output voltage and current will be substantially zero because of the opposed polarity or sense of the winding directions in the secondary windings. When a block of magnetic material is brought into proximity with the face of the sensor, the symmetrical flux pattern or straight flux pattern will be upset causing more flux linkages between the windings 33, 34 positioned adjacent the block of foreign material. This will cause a fundamental voltage to be induced in the winding 34 while the winding 32 is not similarly affected. Since these windings are connected in opposition a differential signal will be present which is applied to the full wave rectifier. Whenever the foreign material is of a low resistivity type, an unbalance in the normally balanced secondary winding is caused by the disturbed fringe flux pattern so as to load down the front coil on the head of the sensing element. Any material which is a good conductor or having a low specific resistivity will have a current flow induced therein due to the flux field passing therethrough. This has the effect of adding a load or secondary voltage and current to the sensing head. With a straight bar type sensor, the magnetic circuit is such as to normally present a relatively poor coupling between the coils positioned on the core and the presence of a loading will further decrease the coupling between the windings on the front or near the active surface of the core member. The coils or windings on the opposite extremity of the core member, that is the windings 31, 32 will be relatively unaffected and hence an output of an alternating current voltage differential will be obtained between the windings 32, 34 which is of a different sense than that presented by the presence of a foreign object of magnetic material. However, the rectifier will produce a D.C. output signal to the amplifying auparatus to indicate the presence of the foreign metal object. If an alternating current output is desired from the sensor, the rectifier 50 can be omitted and suitable amplification equipment associated therewith.

The modification of the detecting apparatus shown in FIGURE 3 again employs the transformer principle with the primary windings 31, 33 connected to the alternating current power source through conductors 20, 21 and the windings 31—34 are mounted on the core member indicated schematically at 30 which is of the straight bar type. In this embodiment the secondary windings 32, 34 include taps indicated at 111, 112. The extremities of the winding 34 are connected through diodes 114, 115 to a common connection and a conductor 118. The winding 32 has its extremities connected through oppositely poled diodes 116, 117 with a common connection therebetween being connected to a conductor 119. Resistance elements 120, 121 and 122 are connected between the conductors 118, 119 to form with the secondary windings a bridge type circuit with the resistor 121 being adjustable for balance purposes and having a wiper 124 connected to conductor 53 leading to the control windings of the pre-amplifier section 60. The taps 111, 112 are connected in common by conductor 125 leading to the conductor 54 and the control windings 55, 56 of amplifier 60 (not shown). This circuit has the secondary windings independently connected to rectifiers to give a quiescent output current in the fixed resistors. The straight bar type core member provides a large air gap in the magnetic circuit such that flux linkage between inside and outside windings on the core is small and loading effect on the primary windings of the circuit in terms of reflected secondary load current is also small. The load is connected between the resistors and the common connection between the secondary windings. With no foreign metal object present, the current flowing in each of the secondary rectifier circuits through their corresponding fixed resistor loads and a portion of the adjustable resistor 121 to the useful load, which herein is the control windings of the pre-amplifier section, is balanced out so that there is no net current flow. With a magnetic foreign material present at the exposed end of the coil or the active end, the coupling between the inner and outer windings on the front or active end is changed more than the coupling on the opposite extremity of the core member. Consequently a larger voltage appears across the windings on the active end of the core and an output D.C. flows in the load circuit. With the introduction of a low resistivity material at the sensing face current is caused to flow within the foreign material from the disturbed fringing flux pattern. This flux flow or eddy current flow distrubs the front coils near the active end of the core member more than the windings at the rear end of the core member and consequently an output D.C. flows in the load circuit but with a different polarity since the eddy currents act as a secondary coil on the primary of the sensor. With this arrangement the rectifiers always carry current so that as soon as the flux pattern is disturbed even slightly there is an immediate small current flow in the load circuit and no cracking voltage necessary to overcome the forward drop of the rectifiers is required.

The circuit shown in FIGURE 4 is another embodiment of the sensing head in which only two windings are utilized. The same straight bar type core member is shown in FIGURES 5 and 6, but the pair of windings at each half of the core are replaced by a single winding identified in the FIGURE 4 as 130, 140 respectively. These windings are connected to the source conductors 20, 21 and the windings have connected thereto a pair of impedances Z1, Z2, numbered 132, 142 to form a bridge circuit with the coils. Either the winding 130 or the winding 140 would be positioned on the active half of the core and the other on the opposite half and the bridge or impedance circuit would be energized from the alternating current source of power. The common connection between the coils 130, 140 is connected to a conductor 145 leading to a full wave rectifier 146 whose input circuit is completed through a conductor 147 to the common connection between the impedances 132, 142 in a conventional manner. The output from the rectifier 146 is obtained through the output terminals 148, 149 of the full wave rectifier which are in turn connected to the leads 53, 54 leading to the control windinngs 55, 56 of the pre-amplifier section 60 (not shown) of the apparatus. In this arrangement, current flow through the legs of the bridge and including the windings and the impedance members, which can be either resistor, capacitance or inductance members of equal value, is such that the bridge would be balanced under normal conditions. When a block of magnetic material foreign metal object is presented to the exposed end of the sensing head, the spray flux pattern is changed on the front of the sensor and the rear pole face is relatively unaffected. The concentration of the flux lines will cause an apparent change in inductance of the front coil causing it to become larger while the back coil 140 is unaffected. Since the coils are connected in series the change in inductance will cause an unbalance in the bridge circuit causing current to flow through the rectifier 146 to the load or control windings of the amplifier 60.

When the foreign metal object is a low resistivity material the flux in the front coil is again changed by loading effect and this loading tends to decrease the inductance on the front coil causing an output of a different phase than that caused by the magnetic type of foreign material or metal. Since the full wave rectifier 146 is connected across the output diagonals of the bridge, the phase of response is unimportant and signal will be delivered to the control windings of the amplifier 60 to operate the switching device or responsive apparatus associated therewith.

With the present apparatus a simplified detecting head is provided which is economical to manufacture and is easy to install. This arrangement also provides the sensing device which will sense the presence of a number of foreign metal objects without requiring any additional circuitry with special energization circuits. In considering this invention it should be kept in mind that the present disclosure is intended to be illustrative only and the invention should be determined by the appended claims.

I claim:

1. In a metal detector, a sensing head having a straight bar type magnetic core member, a plurality of windings mounted on said core member, means connecting at least two of said windings having equal turns in series relationship to one another and to an alternating current source of power, said two of said windings being equally distributed on opposite halves of said core member, circuit means including rectifier means and output connections electrically coupled to said two of said windings, and means connected to said output connections and operated in response to the output from said sensing head, the energized windings on said core member producing a flux field which is adapted to be disrupted by the presence of a foreign metallic object brought in proximity with one of said extremities of said bar type core member causing a variation in impedance in at least one of said windings and altering a balanced null output condition at said output connection to create a signal output in said circuit means to control said last named means.

2. In a metal detector, a sensing head having a straight bar type magnetic core member, a plurality of windings mounted on said core member, means connecting at least two of said windings having equal turns in series relationship and to an alternating current source of power, said two of said windings being equally distributed along opposite halves of said core member, circuit means including output connections electrically coupled to said energized series connected windings, and means including an amplifier means connected to and controllably energized from the output connections of said circuit means, the energizing windings on said core member producing a spray flux field which is adapted to be altered by the presence of a foreign metal object brought into proximity with only one extremity of said core member and causing a substantial variation in impedance in at least the winding on the half of said core member adjacent the object to be sensed to alter a balanced null output condition at said output connections and create a signal output at said output connections of said circuit means to control said amplifier means.

3. In a metal detector, a sensing head having a straight bar type magnetic core member, a plurality of windings mounted on said core member, means connecting at least two of said windings in series opposing relationship and to an alternating current source of power, said two of said windings being equally distributed over opposite halves of said core member, circuit means including rectifier means and output connections electrically coupled to said two of said energized series connected windings, means including amplifying means connected to and controllably energized from the output connections of said circuit means, the energizing windings on said core member producing a spray flux field which is adapted to be altered by the presence of a foreign metal object brought into proximity with only one extremity of said core member altering a balanced null output condition at said output connections and causing a variation in impedance in at least one of the windings on the halves of the core member adjacent said object to be sensed to create a signal output at said output connections of said circuit means to control said amplifying means.

4. In a metal detector, a sensing head having a straight bar type magnetic core member, a plurality of windings mounted on said core member, means connecting at least two of said windings in series relationship to one another and to an alternating current source of power, said two of said windings being positioned on opposite halves of said core member, circuit means including other of said windings and rectifier means with output connections connected thereto, said circuit means being electrically coupled to said two of said windings, and means connected to said output connections and operated in response to an output signal from said sensing head, the energized windings on said core member producing a flux field which is adapted to be altered by the presence of a foreign metal object brought into proximity with one extremity of said bar type core member causing a variation in impedance in some of said windings and creating said output signal in said circuit means to control the operation of said responsive means.

5. In a metal detector, a sensing head having a straight bar type magnetic core member, a plurality of windings mounted on said core member, means connecting at least two of said windings in series relationship to one another and to an alternating current source of power, said two of said windings being positioned on opposite halves of said core member, circuit means including other of said windings also positioned on opposite ends of said core member and including a full wave rectifier with output connections connected thereto, said circuit means being electrically coupled to said two of said windings, and means connected to said output connections and operated in response to a signal output from said sensing head, the energizing windings on said core member producing a flux field which is adapted to be altered by the presence of a foreign metal object brought into proximity with one extremity of said bar type core member causing a variation in impedance in some of said windings and creating said signal output in said circuit means to control the operation of said responsive means.

6. In a metal detector, a sensing head having a straight bar type magnetic core member, a plurality of windings mounted on said core member, means connecting at least two of said windings in series relationship to one another and to an alternating current source of power, said two of said windings being positioned on opposite halves of said core member, circuit means including other of said windings also positioned on opposite ends of said core member and including a full wave rectifier with output connections connected thereto, said circuit means being connected to said two of said windings, and means connected to said output connections and operated in response to a signal output from said sensing head, the energized windings on said core member producing a flux field which is adapted to be altered by the presence of a foreign metal object brought into proximity with one extremity of said bar type core member causing a variation in impedance in some of said windings and creating said signal output in said circuit means to control the operation of said responsive means.

7. In a metal detector, a sensing head having a straight bar type magnetic core member, a plurality of windings mounted on said core member, means connecting at least two of said windings in series relationship to one another and to an alternating current source of power, said two of said windings being positioned on opposite halves of said core member, circuit means including other of said windings positioned on opposite ends of said core member and including output connections connected thereto, and means connected to said output connections and operated in response to a signal output from said sensing head, the energized windings on said core member producing a flux field which is adapted to be altered by the presence of a foreign metal object brought into proximity with one extremity of said bar type core member causing a variation in impedance in some of said windings and creating said signal output in said circuit means to control the operation of said responsive means.

8. In a metal detector, a sensing head having a straight bar type magnetic core member, a plurality of windings mounted on said core member, means connecting at least two of said windings in series relationship to one another and to an alternating current source of power, said two of said windings being positioned on opposite halves of said core member, circuit means including other of said windings and output connections connected thereto, said circuit means being electrically coupled to said two of said windings, and means connected to said output connections and operated in response to an output signal from said sensing head, the energized windings on said core member producing a flux field which is adapted to be altered by the presence of a foreign metal object brought into proximity with one extremity of said bar type core member causing a variation in coupling between one of said energized windings and one of said other of said windings positioned on said one extremity of said bar type core member to create a signal output in said circuit means to control the operation of said responsive means.

9. In a metal detector, a sensing head having a straight bar type magnetic core member, a plurality of windings mounted on said core member, first circuit means connecting at least two of said windings having equal turns in series relationship to one another and to an alternating current source of power, said two of said windings being equally distributed on opposite halves of said core member, second circuit means including output connections electrically coupled to said energized windings having normally a condition of null output at said output connections, and means connected to said output connections and operated in response to a signal output from said sensing head, the energized windings on said core member producing a flux field which is adapted to be disrupted by the presence of a foreign metallic object brought in proximity with one of said extremities of said bar type core member causing a variation in impedance in some of said windings to alter the condition of null output at said output windings and creating said signal output in said second circuit means to control said last named means.

10. In a metal detector, a sensing head having a straight bar type magnetic core member, two pairs of windings mounted on said core member with windings in each pair being mounted concentrically to one another and the pairs being mounted on opposite halves of said straight core member, first circuit means connecting at least two of said windings in a serially opposed relationship to an alternating current source of power, second circuit means including output means electrically coupled to said energized windings, and means connected to the output connections and operated in response to a signal output from said sensing head, the energized windings on said core member producing a spray flux field which is adapted to be disrupted by the presence of a foreign metal object brought into proximity with one of the extremities of said bar type core member causing a variation in impedance in some of said windings and creating said signal output in said second circuit means to control the operation of said responsive means.

11. In a metal detector, a sensing head having a straight bar type magnetic core member, two pairs of windings mounted on said core member with windings in each pair being mounted concentrically to one another and the pairs being mounted on opposite halves of said straight core member, first circuit means connecting said windings of said pairs in a bridge circuit with windings of each pair in diametrically opposed legs of the bridge circuit, second circuit means including demodulator means and output connections connected to said bridge circuit, and means connected to the output connections and operated in response to a signal output from said sensing head, the energized windings on said core member producing a spray flux field which is adapted to be disrupted by the presence of a foreign metal object brought into proximity with one of the extremities of said bar type core member causing a variation in impedance in some of said windings and creating said signal output in said second circuit means to control the operation of said responsive means.

12. In a metal detector, a sensing head having a straight bar type magnetic core member, two pairs of windings mounted on said core member with windings in each pair being mounted concentrically to one another and the pairs being mounted on opposite halves of said straight core member, first circuit means connecting said windings of said pairs in a bridge circuit and connected to an electrical source of power with windings of each pair positioned in diametrically opposed legs of the bridge circuit, second circuit means including output connections connected to said bridge circuit, and means connected to the output connections and operated in response to a signal output from said sensing head, the energized windings on said core member producing a spray flux field which is adapted to be disrupted by the presence of a foreign metal object brought into proximity with one of the extremities of said bar type core member causing a variation in impedance in some of said windings and creating said signal output in said second circuit means to control the operation of said responsive means.

13. In a metal detector, a sensing head having a straight bar type magnetic core member, two pairs of windings mounted on said core member with windings in each pair being mounted concentrically to one another and the pairs being mounted on opposite halves of said straight core member, a casing of magnetic material surrounding said core member and windings and including an end cap of high electrical resistivity positioned adjacent one extremity of said core member, first circuit means connecting said windings of said pairs in a bridge circuit and connected to an electrical source of power with windings of each pair positioned in diametrically opposed legs of the bridge circuit, second circuit means including output connections connected to said bridge circuit, and means connected to the output connections and operated in response to a signal output from said sensing head, the energized windings on said core member producing a spray flux field which is adapted to be disrupted by the presence of a foreign metal object brought into proximity with one of the extremities of said bar type core member causing a variation in impedance in some of said windings and creating said signal output in said second circuit means to control the operation of said responsive means.

14. In a metal detector, a sensing head having a straight bar type magnetic core member, two pairs of windings mounted on said core member with windings in each pair being mounted concentrically to one another and the pairs being mounted on opposite halves of said straight core member, first circuit means connecting at least two of said windings in a serially opposed relationship to an alternating current source of power, second circuit means including the other windings of said pairs connected to demodulator means and output circuit means and electrically coupled to said first named windings, and means including amplifier means connected to said output connections and controllably energized from a signal output therein, the energized windings on said core member producing a spray flux field which is adapted to be disrupted by the presence of a foreign metal object brought into proximity with one of the extremities of said bar type core member causing a concentration of flux in an increased coupling of said windings closest to said one of said extremities of said core member to create said signal output in said second circuit means to control the operation of said amplifier means.

References Cited in the file of this patent
UNITED STATES PATENTS

| | | |
|---|---|---|
| 2,033,654 | Selquist et al. | Mar. 10, 1936 |
| 2,057,835 | Karajan et al. | Oct. 20, 1936 |
| 2,240,184 | Hathaway | Apr. 29, 1941 |
| 2,418,686 | Zuschlag | Apr. 8, 1947 |
| 2,549,567 | Berman | Apr. 17, 1951 |

FOREIGN PATENTS

| | | |
|---|---|---|
| 484,664 | Great Britain | May 4, 1938 |